INVENTORS
JOHN T. THOMPSON
MAYNARD J. COMEAU

BY
AGENT

June 23, 1964 J. T. THOMPSON ETAL 3,138,255
TRANSPORT CONTAINERS FOR SUBASSEMBLIES
Filed June 22, 1962 3 Sheets-Sheet 2

INVENTORS
JOHN T. THOMPSON
MAYNARD J. COMEAU
BY
AGENT

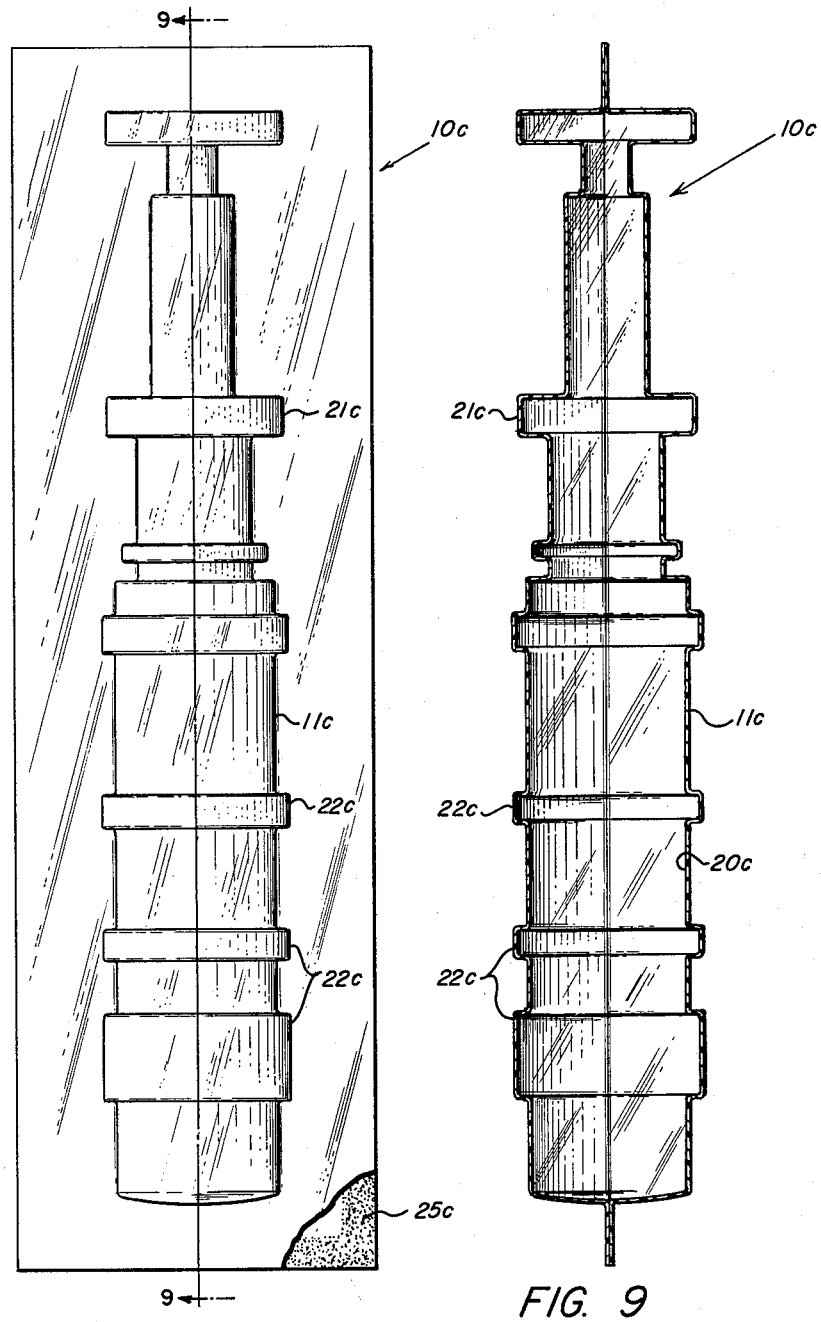

United States Patent Office 3,138,255
Patented June 23, 1964

3,138,255
TRANSPORT CONTAINERS FOR SUBASSEMBLIES
John T. Thompson, Wellesley Hills, and Maynard J. Comeau, Scituate, Mass., assignors to Raytheon Company, Lexington, Mass., a corporation of Delaware
Filed June 22, 1962, Ser. No. 204,418
2 Claims. (Cl. 206—65)

This invention relates to novel packaging devices and has particular reference to containers for transporting one or a plurality of delicate partially fabricated subassemblies such as electron tube components.

In the manufacture of fragile devices such as electron tubes, it is necessary to prefabricate and assemble components into subassemblies which are to be subsequently assembled into resultant tube structures and to transport such subassemblies from one location to another in order to efficiently perform the various assembly operations. During the transport of such subassemblies, the units are often subjected to careless handling or to unexpected mechanical shock hazards which result in damage to one or more of the delicate parts of the subassemblies, thereby resulting in loss of the entire damaged subassemblies. Furthermore, the units are generally transported in relatively heavy non-disposable tote box containers which do not lend themselves to feeding into automatic assembly equipment, and which are usually open-topped or otherwise unsealed containers into which the units are loosely piled in relatively large quantities. Therefore, the units not only become easily damaged but subject to contamination by dust or gases in the atmosphere through which the filled containers are transported.

In accordance with the present invention, a novel container is provided for transporting such subassemblies between assembly stations, which container supports the subassemblies in substantially the same manner as the subassemblies are eventually supported in the resultant tube structures. For example, the electrode units or subassemblies of receiving tubes comprise a number of cathodes, grids and anodes which are positioned in predetermined spatial interelectrode relationships and mounted on suitable respective stem or base structures. Such units are thereafter assembled within vacuumized envelopes by sealing the stem structures to the envelopes in such a manner that each stem structure becomes a part of the envelope structure. In such tubes the electrode units extend into interiors of the respective envelopes but are suspended upon and supported by the stem structures, with only the peripheral edges of one of the components engaging the envelope to prevent undesired lateral movement of the unsupported ends of the units such as might rupture the junction between the components and the stem.

In accordance with this invention we have found that such subassemblies may be safely transported within containers which are provided with cavities for receiving the subassemblies, which cavities are provided with portions thereof shaped to relatively snugly embraced the stem structures of the subassemblies, with the remaining areas of the cavities having shapes conforming generally to the exterior shapes of the adjacent portions of the subassemblies slightly larger except in one or more restricted areas where contact is made between a component and the cavity wall, whereby the major portions of the subassemblies are freely suspended within the cavities with only the stem portions thereof being restrained to prevent longitudinal movement of the units. Thus, the subassembly units may be transported while being supported in substantially the same manner as they are supported in a completed tube structure.

Accordingly, it is one of the primary objects of this invention to provide a container for supporting delicate subassembly units in a manner similar to that in which such units are to be eventually supported in a completed structure.

Another object is to provide a novel light-weight container which completely seals therein a number of delicate subassembly units and protects the units from contamination by dust or the like.

Another object is to provide a container of the above character wherein a plurality of units are supported in a manner whereby only restricted areas thereof are rigidly restrained, while the remaining portions thereof are freely suspended.

Another object is to provide a container of the above character wherein fragile articles such as subassembly units of electron tubes may be supported and efficiently transported without damage from careless handling, applied mechanical shocks, or the like.

Other objects and advantages of the invention will become apparent from the following description taken in connection with the accompanying drawings wherein:

FIG. 8 is an elevational view of another modified container embodying cavities of a type suitable for conveying a still different type of subassembly unit; and FIG. 9 is a sectional view taken substantially on line 9—9 FIG. 8 through the cavity therein.

Figure 1:
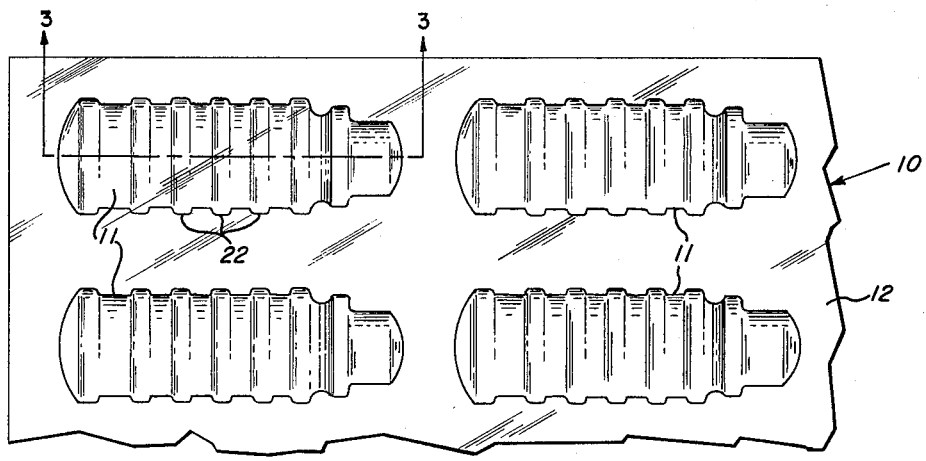
FIG. 1 is a fragmentary elevational view of a container embodying the invention.

Referring more particularly to the drawings wherein like characters of reference designate like parts throughout the several views, the container 10 of FIG. 1 is formed of flexible strip material of any suitable medium such as plastic, paper, metal or the like, preferably acetate, and may be transparent or opaque. The strips are produced with cavities therein of the desired configuration, and two strips 12 and 13 (FIG. 3) are subsequently superimposed upon one another, with strip 13 being inverted so that the respective cavities in the two strips 12 and 13 are aligned with each other as shown in FIG.

3, thus forming a container wherein each pocket or cavity 11 has one-half of its volume in each strip.

The strips may be made and dimensioned to any selected size by known methods and the cavities also may be provided in the strips in any suitable manner such as, for example, by heating a strip of thermoplastic resin, drawing the strip over a die containing recesses of the selected size, number, and configuration, and creating a vacuum within the die-formed recesses to stretch the adjacent portions of the strip into the recesses, and then cooling the strip to harden the resin whereupon the cavities are integrally formed in the strip. Instead of using a vacuum to stretch the strip, a plunger or female die may be used for this purpose.

Each cavity or pocket 11 is specifically shaped and dimensioned to receive a particular assembly unit such as, for example, an electrode subassembly unit 14 (FIG. 3) for use in electron tubes. Such a unit comprises longitudinally extending cathode, grid and anode electrodes, indicated as a group by numeral 15 in FIG. 3, which are assembled into a unit with supporting members or discs 16 and 17 at the ends. Extending through disc 17 at one end of unit 14 are pins or terminals 18 which project longitudinally of the unit through a stem or base member 19 which comprises a glass disc or button into which the terminals are sealed. The button 19 preferably becomes an end wall of the glass envelope of the electron tube (not shown) into which unit 14 is subsequently mounted. One of the discs 16 or 17 is adapted to be mounted in physical contact with the inner side wall of a tube envelope in the completed structure. This disc may contact the envelope throughout its periphery or may be provided with a number of short projections on its periphery for providing contact, whereby the unit is prevented from undesired motion in a direction transverse to the longitudinal axis of the unit.

The cavities 11 in the container 10 support and retain the delicate units 14 in substantially the same manner as they are to be eventually supported and retained in the completed electron tube structure. Therefore, the inner surface of each cavity 11 is provided with a circumferential area 20 which is substantially the same diameter as the outer terminal or disc 17, or disc 16 as the case may be, which is to interfit with area 20 whereby lateral motion of the unit is prevented.

Figure 5:
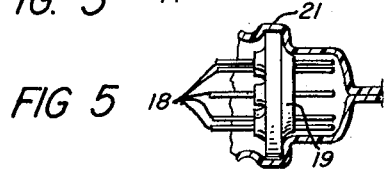
FIG. 5 is an enlarged sectional view of the stem and portion of the subassembly unit illustrated in FIG. 3 showing the method of restraining the unit from longitudinal displacement within a cavity.

Most of the remainder of the inner wall of cavity 11 is spaced from the unit 14, although it may have a configuration substantially similar to the external configuration of the subassembly unit. However, the stem button 19 of the unit 14 is relatively snugly embraced by an annular portion 21 of the cavity, as shown clearly in FIG. 5 wherein it will be noted not only is the peripheral edge of the button engaged by annular portion 21, but at least a portion of the side surfaces of the button are also engaged by the sides of annular portion 21. Thus, the button is restrained from both transverse and lateral displacement within the cavity. It will be apparent, therefore, that the unit 14 is prevented from moving longitudinally within cavity 11; further, since the button 19 is spaced longitudinally from the disc 17, no pivotal movement of the unit can occur about a fulcrum provided by the disc.

Cavity 11 also has a series of outwardly bulging reinforcing convolutions 22 which may be provided in any desired number for reinforcing the walls of the cavity.

Figure 2:
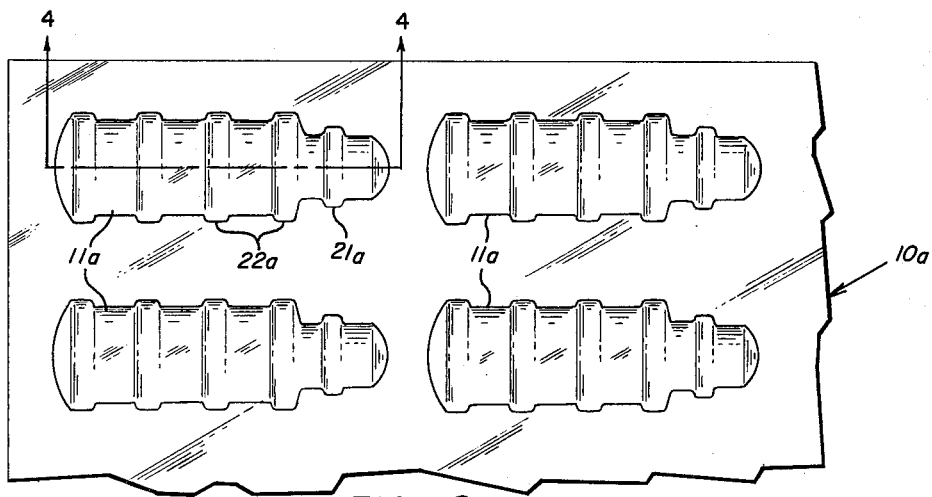
FIG. 2 is a fragmentary elevational view similar to FIG. 1 illustrating a modified form of container embodying the invention.
Figures 3, 4:
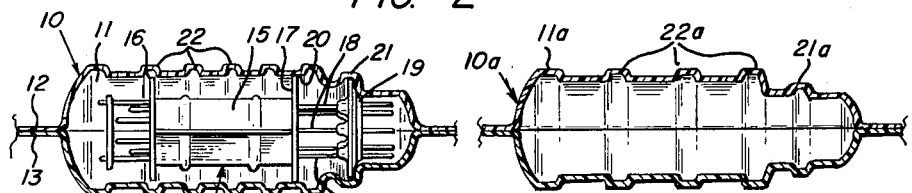
FIG. 3 is a sectional view taken substantially on line 4—4 of FIG. 2 through a cavity therein.
FIG. 4 is a sectional view taken substantially on line 4—4 of FIG. 2 through a cavity therein.

In FIGS. 2 and 4 are illustrated a container 10a having cavities 11a therein of slightly different configuration for carrying a different type of subassembly unit, this container being provided with a base-enclosing annular portion 21a but having fewer annular reinforcing convolutions 22a.

Figure 6:
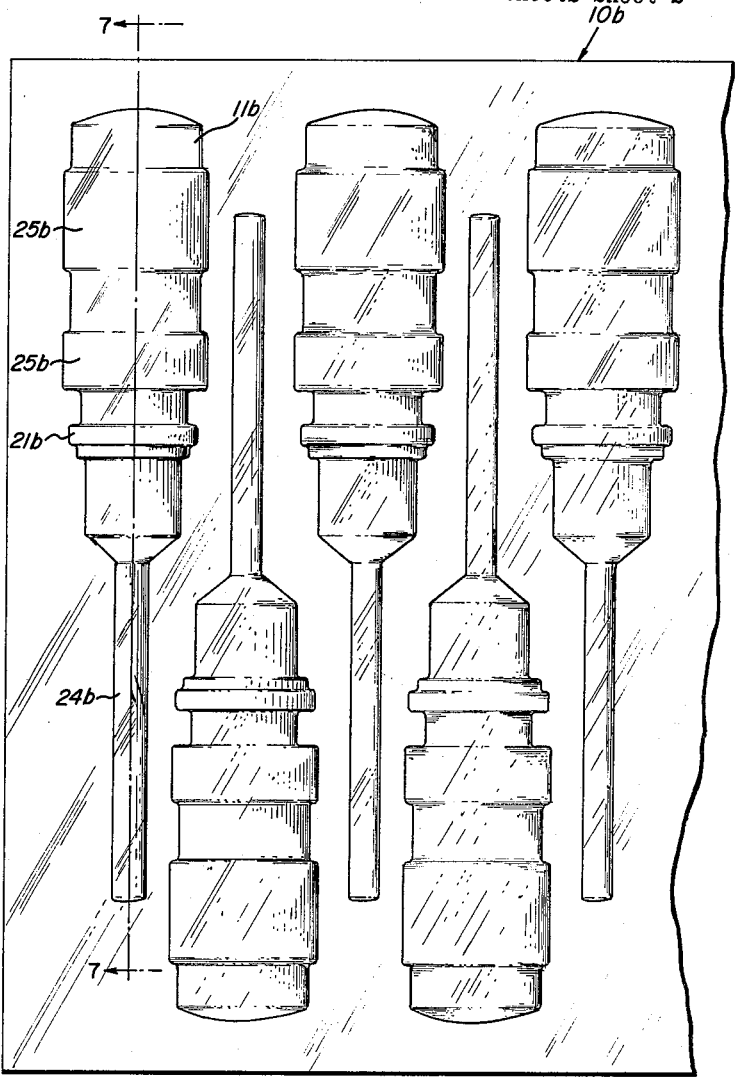
FIG. 6 is a fragmentary elevational view of a container illustrating still another modified form of the invention.
Figure 7:
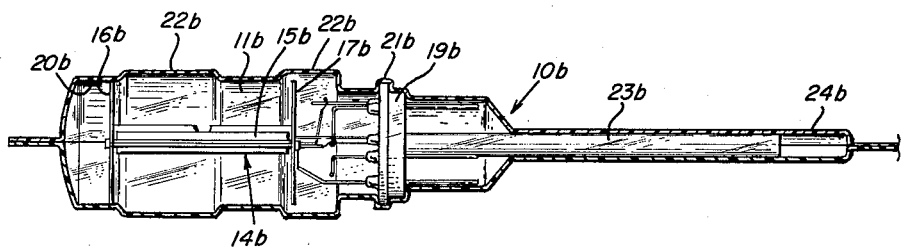
FIG. 7 is a sectional view taekn substantially on line 7—7 of FIG. 6 through one of the cavities therein, showing a subassembly unit in the cavity.

In FIGS. 6 and 7 the illustrated container 10b is provided with cavities 11b each of which receives a subassembly unit 14b having electrodes 15b, including discs 16b and 17b, and stem button 19b. One of the discs, in this case disc 16b, is engaged throughout its periphery by the inner circumferential area 20b of the wall of the cavity to prevent transverse motion of the unit. The stem button 19b is closely embraced by annular portion 21b to prevent longitudinal displacement of the unit. In this particular modification, the unit has a stem 23b which projects outwardly and axially from the button 19b into a portion 24b of the cavity, which portion 24b is shaped to snugy close a major part of the length of the stem. Thus, the relatively long and fragile stem 23b is prevented from any transverse movement which might tend to cause breakage, particularly since the stem is generally made of glass. The cavity 11b of this particular structure employs two relatively wide reinforcing annular convolutions 22b in addition to the annular button-enclosing portion 21b, all of which function to strengthen the cavity wall.

The container 10c illustrated in FIGS. 8 and 9 is adapted to contain still another type of subassembly unit (not shown). In this case, the two superimposed strips form between them one or more cavities 11c each of which includes one or more annular areas 21c for embracing a button or base on a unit to be enclosed within the cavity, and a number of reinforced annular convolutions 22c for strengthening the structure, as well as one annular inner wall surface 20c which may be used to surround the periphery of one of the components of the unit to be enclosed. Thus, a unit may be supported and simultaneously restrained from lateral or longitudinal movement, just as it is intended to be eventually supported in a completed tube structure.

The subassembly units may be placed within the cavities in one container strip 11 either by hand fed operation or by automation. After a strip 11 has been filled with units, the second strip 12 is superimposed over the filled strip 11 and the edges are then sealed together as by use of a selected adhesive cement 25c (FIG. 8) or by heat sealing or other method whereby the container is completed. Although such sealing of the edge portions 25c is illustrated only in FIG. 8, it is to be understood that all the containers 10, 10a, and 10b are similarly tightly sealed.

From the foregoing it will be apparent that a novel container has ben provided in accordance with all the objects of this invention, which container supports delicate and easily damaged subassembly units, such as electrode structures for electron tubes, in substantially the same manner as they are to be eventually supported in a completely assembled device, whereby during support in the container the subassembly units are prevented from damage such as otherwise might occur. It is to be understood, however, that many changes or modifications in the invention may be made by those skilled in the art without departing from the spirit of the invention as expressed in the accompanying claims. Therefore, all matter shown and described is to be intrepreted as illustrative and not in a limiting sense.

We claim:

1. In combination; a fragile electrode subassembly comprising a base, at least one supporting disc, and electrical elements supported by said base and disc, and a container carrying said subassembly in a manner to prevent breakage of said electrical elements, said container comprising two strips of deformable material disposed in contiguous superimposed relation and joined together throughout their marginal areas, said strips each having therein a number of like pre-formed recesses, the recesses in each strip projecting outwardly from the strip in a direction away from the opposed strip and being aligned with respective recesses in the opposed strip and forming therewith cavities for receiving respective subassemblies, each cavity further having therein an integral annular outwardly bulging convolution of a circumference substantially equal to the circumference of said base and having portions engaging opposite side surfaces of the base to prevent the movement of the subassembly longitudinally within said cavity and said cavity further having therein an inner wall portion of a circumference substantially equal to the circumference of said disc for preventing lateral displacement of said subassembly within said cavity.

2. A combination in accordance with claim 1 wherein said electrical elements extend through said base, and said cavity further having an elongated portion extending from said convolution, said elongated portion having a circumference to permit said electrical elements, extending through said base, to be suspended freely within said cavity.

References Cited in the file of this patent

UNITED STATES PATENTS

| | | |
|---|---|---|
| 2,952,353 | Rohdin | Sept. 13, 1960 |
| 3,018,015 | Agriss et al. | Jan. 23, 1962 |
| 3,048,267 | Starzec | Aug. 7, 1962 |
| 3,070,648 | Hennessey | Dec. 25, 1962 |
| 3,084,791 | Hawley | Apr. 9, 1963 |

FOREIGN PATENTS

| | | |
|---|---|---|
| 986,640 | France | Apr. 4, 1951 |